US010794301B2

(12) United States Patent
Berkemeier et al.

(10) Patent No.: US 10,794,301 B2
(45) Date of Patent: Oct. 6, 2020

(54) FUEL SUPPLY SYSTEM, INTERNAL COMBUSTION ENGINE SYSTEM, AND METHOD FOR SUPPLYING AN INTERNAL COMBUSTION ENGINE WITH AN LPG FUEL

(71) Applicant: Ford Global Technologies, LLC, Dearborn, MI (US)

(72) Inventors: Oliver Berkemeier, Bergisch Gladbach (DE); Albert Breuer, Cologne (DE); Ulrich Kramer, Bergisch Gladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 520 days.

(21) Appl. No.: 15/684,725

(22) Filed: Aug. 23, 2017

(65) Prior Publication Data
US 2018/0058348 A1 Mar. 1, 2018

(30) Foreign Application Priority Data
Aug. 25, 2016 (DE) .................. 10 2016 215 972

(51) Int. Cl.
*F02D 19/06* (2006.01)
*F02D 19/08* (2006.01)
*F02M 37/04* (2006.01)

(52) U.S. Cl.
CPC ..... *F02D 19/0649* (2013.01); *F02D 19/0607* (2013.01); *F02D 19/0615* (2013.01);
(Continued)

(58) Field of Classification Search
CPC ............. F02D 19/0649; F02D 19/0607; F02D 19/0615; F02D 19/0628; F02D 19/0684;
(Continued)

(56) References Cited

U.S. PATENT DOCUMENTS

| 5,150,731 A | 9/1992 | Jiro |
| 5,775,282 A | 7/1998 | Smith |

(Continued)

FOREIGN PATENT DOCUMENTS

| CN | 202360804 U | 8/2012 |
| DE | 4308775 C1 | 8/1994 |

(Continued)

OTHER PUBLICATIONS

Kuske, A. et al. ,"Supercharged Internal Combustion Engine With Compressor, Exhaust-Gas Recirculation Arrangement and Flap," U.S. Appl. No. 15/684,795, filed Aug. 23, 2017, 49 pages.

*Primary Examiner* — Lindsay M Low
*Assistant Examiner* — Ruben Picon-Feliciano
(74) *Attorney, Agent, or Firm* — Geoffrey Brumbaugh; McCoy Russell LLP (57) ABSTRACT

Methods and systems are provided for a fuel supply system for an internal combustion engine system, in particular of a motor vehicle, having at least one liquefied petroleum gas (LPG) tank for storing an LPG fuel and at least one direct injection unit, which has a direct injection fuel distributor and direct injection valves that can be supplied with fuel via said distributor. In order to improve supply of the internal combustion engine system with LPG fuel, the fuel supply system includes a booster pump inserted between the LPG tank and the direct injection fuel distributor. A discharge side of the booster pump is connected directly to the direct injection fuel distributor by at least one line, and the direct injection valves each have a closure part that rises outward from a valve seat to open the respective direct injection valve.

15 Claims, 6 Drawing Sheets

(52) U.S. Cl.
CPC ..... *F02D 19/0628* (2013.01); *F02D 19/0684* (2013.01); *F02D 19/08* (2013.01); *F02M 37/04* (2013.01); *Y02T 10/36* (2013.01)

(58) Field of Classification Search
CPC .. F02D 19/08; F02D 19/0647; F02D 41/0027; F02D 41/3094; F02D 2200/0611; F02M 37/04; F02M 21/0212; Y02T 10/36
See application file for complete search history.

(56) References Cited

U.S. PATENT DOCUMENTS

| | | | |
|---|---|---|---|
| 6,050,237 | A | 4/2000 | Ferrera et al. |
| 8,245,695 | B2 | 8/2012 | Martin |
| 8,297,922 | B2 | 10/2012 | Cruickshank |
| 9,670,882 | B2 | 6/2017 | Kuske et al. |
| 9,777,689 | B2 | 10/2017 | Schuele |
| 2005/0109400 | A1 | 5/2005 | Glime et al. |
| 2009/0312935 | A1 | 12/2009 | Song et al. |
| 2010/0288367 | A1* | 11/2010 | Pursifull ........... B60K 15/03006 137/2 |
| 2011/0155102 | A1* | 6/2011 | Ten Broeke ........ F02D 19/0605 123/446 |
| 2011/0290203 | A1* | 12/2011 | Pursifull ............. F02D 19/0605 123/41.08 |
| 2012/0041665 | A1* | 2/2012 | Pursifull ................. F01B 1/02 701/103 |
| 2012/0143480 | A1* | 6/2012 | Pursifull ............. F02D 19/0615 701/105 |
| 2013/0108493 | A1 | 5/2013 | Wan et al. |
| 2014/0224209 | A1* | 8/2014 | Pursifull ............ F02M 63/0001 123/294 |
| 2014/0224903 | A1* | 8/2014 | Fujino ................ F02M 51/0664 239/585.1 |
| 2014/0245995 | A1* | 9/2014 | Deliyski ................ F02M 69/50 123/456 |
| 2014/0311445 | A1* | 10/2014 | Ten Broeke ........ F02D 19/0621 123/304 |
| 2015/0020769 | A1* | 1/2015 | Huang ..................... F02B 7/08 123/305 |
| 2015/0059686 | A1* | 3/2015 | Glugla ............... F02M 21/0284 123/299 |
| 2015/0059687 | A1* | 3/2015 | Glugla ................ F02D 41/3845 123/304 |
| 2015/0068495 | A1* | 3/2015 | Pursifull ................ F02M 41/00 123/456 |
| 2015/0308362 | A1* | 10/2015 | Dunn .................. F02D 19/0642 123/300 |
| 2016/0084172 | A1* | 3/2016 | Ten Broeke ........ F02D 41/3845 123/468 |
| 2016/0177860 | A1* | 6/2016 | Pursifull ............ F02D 41/0025 123/294 |
| 2016/0208757 | A1* | 7/2016 | Pursifull ................ F02M 55/02 |

FOREIGN PATENT DOCUMENTS

| | | |
|---|---|---|
| DE | 10104228 A1 | 10/2001 |
| DE | 102004039260 A1 | 3/2006 |
| DE | 102008053873 A1 | 5/2010 |
| EP | 2143916 A1 | 1/2010 |
| WO | 2010077140 A1 | 7/2010 |
| WO | 2015182248 A1 | 12/2015 |

* cited by examiner

FUEL SUPPLY SYSTEM, INTERNAL COMBUSTION ENGINE SYSTEM, AND METHOD FOR SUPPLYING AN INTERNAL COMBUSTION ENGINE WITH AN LPG FUEL

CROSS REFERENCE TO RELATED APPLICATION

The present application claims priority to German Patent Application No. 102016215972.0, filed on Aug. 25, 2016. The entire contents of the above-referenced application is hereby incorporated by reference in its entirety for all purposes.

FIELD

The present description relates generally to methods and systems for a fuel supply system for an internal combustion engine system, in particular of a motor vehicle, having at least one LPG tank for storing an LPG fuel and at least one direct injection unit, which has a direct injection fuel distributor and direct injection valves that can be supplied with fuel via said distributor.

BACKGROUND/SUMMARY

Some internal combustion engine systems can be operated either with a liquid autogas (liquefied petroleum gas; LPG, referred to below as LPG fuel) or with gasoline and/or gasoline fuel blends (e.g., alcohol fuel blends). In some examples, the supply of the gasoline to the internal combustion engine may be used as a reserve supply if the LPG fuel is used up. Usually, an internal combustion engine system of this kind comprises an LPG tank for storing the LPG fuel and at least one direct injection unit for injecting the LPG fuel directly into combustion chambers of the internal combustion engine. The direct injection unit comprises a fuel distributor and direct injection valves that can be supplied with fuel via said distributor. The LPG fuel is fed to the fuel distributor by means of a high-pressure pump. A corresponding internal combustion engine system is known from Thomas in European Patent No. 2,143,916, for example.

However, the inventors herein have recognized potential issues with such systems. As one example, in a hot start condition, the LPG fuel within the direct injection unit, such as within the direct injection valves and a fuel rail, may change from liquid to gas. As a result, a correspondingly equipped motor vehicle cannot be started or may stall during operation. For example, during a hot start, the high-pressure pump may operate for a duration (e.g., 1-2 min) before liquid LPG is injected, leading to an unacceptably long start time. Increasing the pressure of the LPG fuel upstream of the high-pressure pump to about 50 bar may enable the high-pressure pump to supply the LPG fuel. However, there are currently no high-pressure pumps available that can withstand such high upstream pressures.

In one example, the issues described above may be addressed by a fuel supply system for an internal combustion engine, comprising: an LPG tank for storing an LPG fuel; a direct injection unit, including a direct injection fuel distributor and direct injection valves supplied with fuel via said distributor, wherein the direct injection valves each have a closure part that rises outward from a valve seat to open the respective direct injection valve; and a booster pump coupled between the LPG tank and the direct injection fuel distributor, a discharge side of the booster pump directly coupled to the direct injection fuel distributor by at least one line. In this way, by including the booster pump instead of a high-pressure pump for delivery of the LPG fuel to the direct injection fuel distributor, overall vehicle weight and vehicle costs may be reduced.

As one example, the fuel supply system may further include a fuel tank for storing gasoline, a port injection unit for injecting fuel into inlet ducts of the internal combustion engine, and a fuel switching valve. The fuel switching valve may have a first switching state in which the gasoline is fed to the port injection unit and a second switching state in which the LPG fuel is fed to the port injection unit. By actuating the fuel switching valve between the switching states, the fuel (the LPG fuel or the gasoline) that is fed to the port injection unit may be changed. For example, when an amount of LPG fuel in the LPG tank is low (e.g., less than a threshold), the fuel switching valve may be actuated to the first switching state to provide the gasoline to the port injection unit. In contrast, when the amount of LPG fuel in the LPG tank is higher (e.g., greater than or equal to the threshold), the fuel switching valve may be actuated to the second switching state to provide the LPG fuel to the port injection unit. The LPG fuel may be injected via the port injection unit instead of the direct injection unit when the engine is in a hot start condition, for example. In another example, the LPG fuel may be injected via both the direct injection unit and the port injection unit when a power level of the engine is high (e.g., higher than a threshold). In this way supply of the internal combustion engine with LPG fuel may be increased, allowing the motor vehicle to be started and an occurrence of stalling to be decreased, even when a hot start condition is present.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
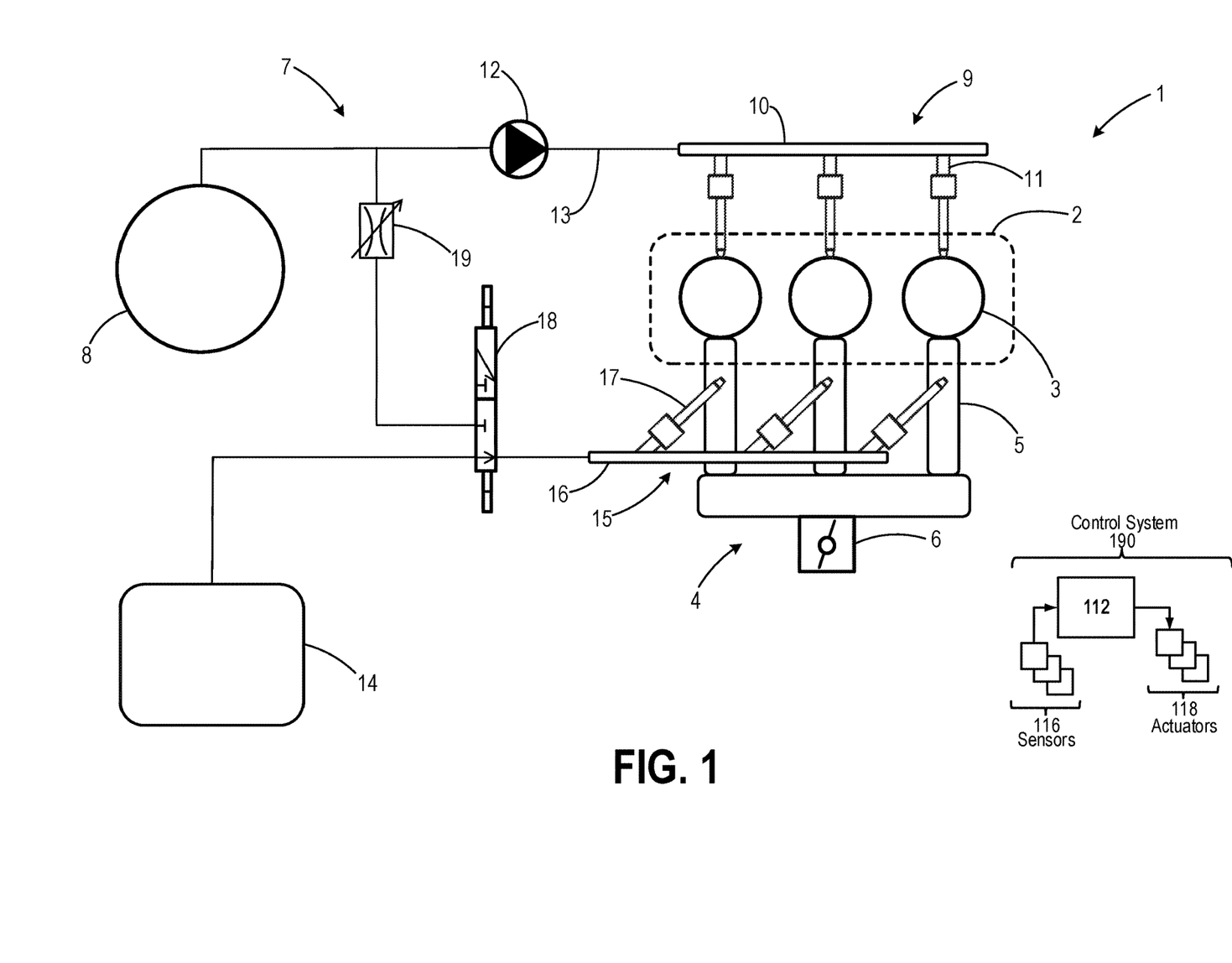
FIG. 1 is a schematic illustration of an exemplary embodiment of an internal combustion engine system according to the present disclosure.
Figure 2:
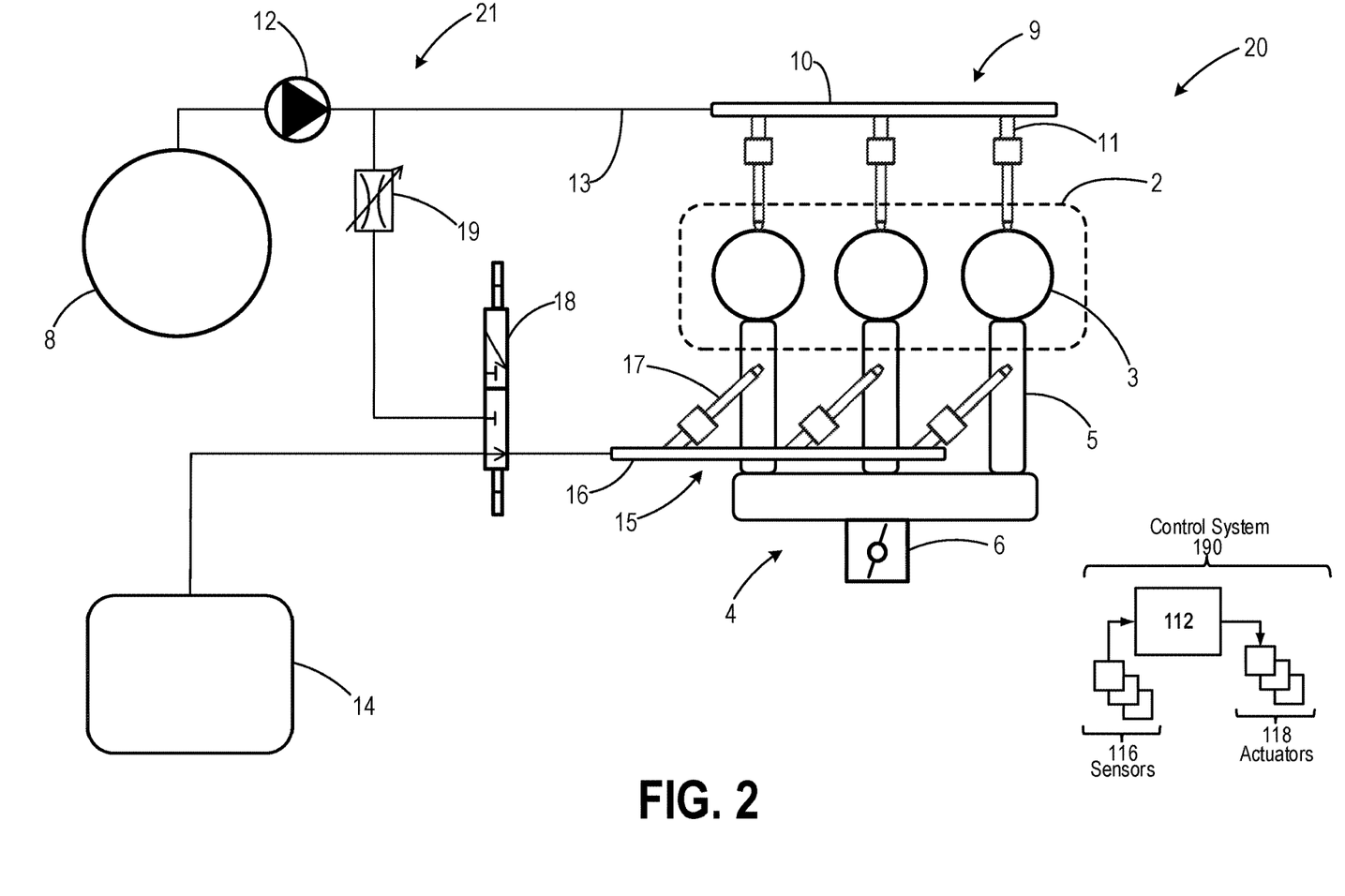
FIG. 2 is a schematic illustration of another exemplary embodiment of an internal combustion engine system according to the present disclosure.
Figure 3:
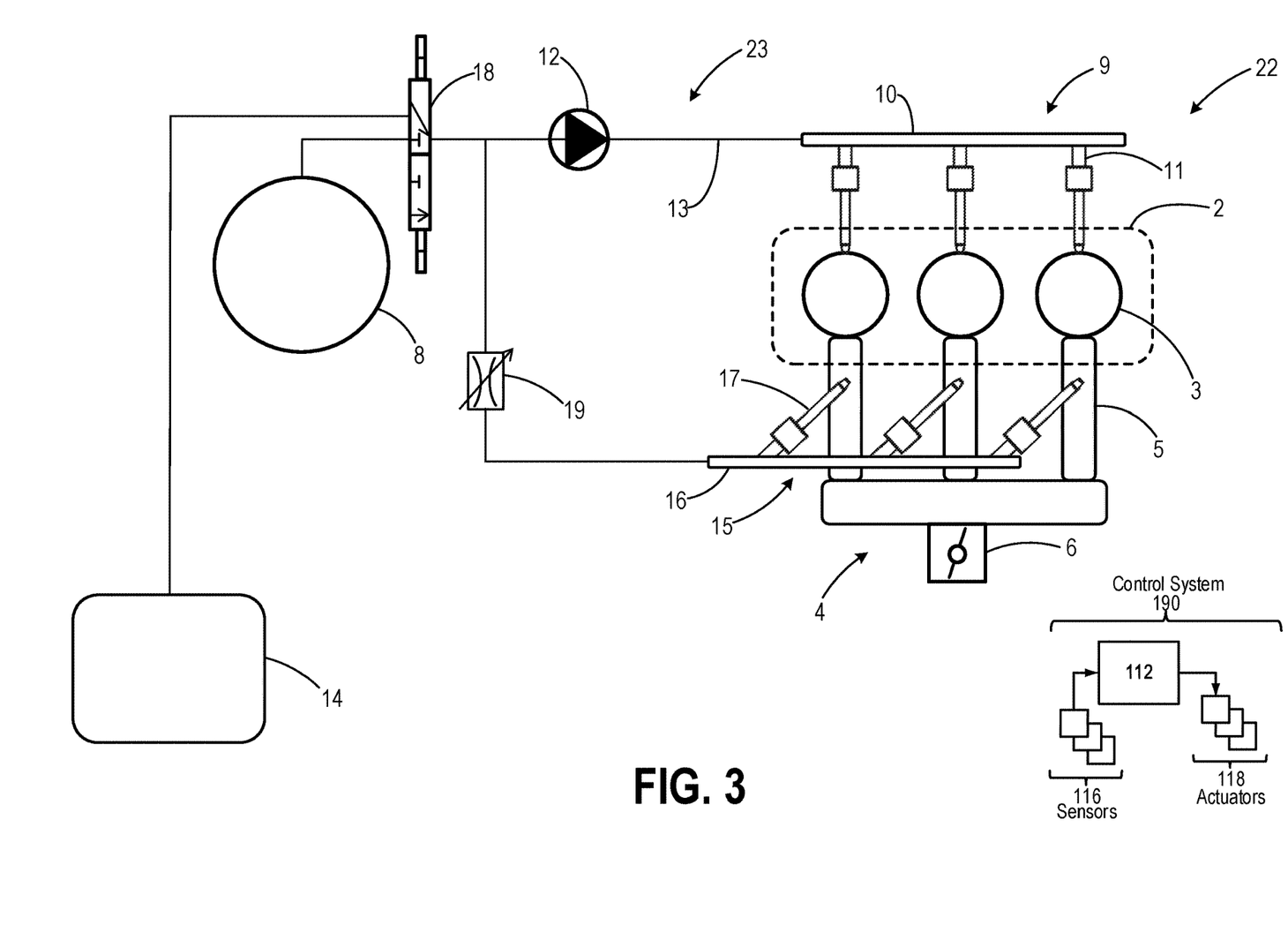
FIG. 3 is a schematic illustration of another exemplary embodiment of an internal combustion engine system according to the present disclosure.

The following description relates to systems and methods for a fuel supply system of an internal combustion engine system, which may be included in a vehicle. Example embodiments of the internal combustion engine system are shown in FIGS. 1-3, which vary in the configurations of the fuel supply system. For example, the fuel supply system configurations shown in FIGS. 1-2 enable LPG fuel to be delivered via both direct injection and port fuel injection and gasoline to be delivered via port fuel injection and not direct injection. In contrast, the fuel supply system configuration shown in FIG. 3 allows gasoline to be additionally delivered via direct injection. Example methods for controlling the fuel supply system, such as by switching between fuels and fuel injection units based on engine operating conditions, are described with respect to FIGS. 4-5. For example, the method of FIG. 4 may be used to control the fuel supply system configurations shown in FIGS. 1-2, and the method of FIG. 5 may be used to control the fuel supply system configuration shown in FIG. 3. A prophetic example showing how the fuel supply system may be controlled during engine operation in order to switch between fuels and fuel injection units as conditions change is shown in FIG. 6.

A fuel supply system according to the present disclosure for an internal combustion engine system comprises at least one LPG tank for storing an LPG fuel, at least one direct injection unit, which has a direct injection fuel distributor and direct injection valves that can be supplied with fuel via said distributor, and comprises a booster pump, which is inserted between the LPG tank and the direct injection fuel distributor. A discharge side of the booster pump may be connected directly to the direct injection fuel distributor by at least one line, and the direct injection valves each have a closure part that rises outward from a valve seat to open the respective direct injection valve. By means of the fuel supply system, it is possible to supply the internal combustion engine, e.g., a spark-ignition engine that is pressure-charged or not pressure-charged, with the LPG fuel. The internal combustion engine system can be used to drive a motor vehicle, such as a land vehicle (e.g., a passenger car or a heavy goods vehicle), a rail vehicle, a watercraft, or an aircraft.

According to the present disclosure, the booster pump, which does not produce high pressure, is used to supply direct injection valves instead of a high-pressure pump. By means of the booster pump, a pressure within a liquid, in particular a liquefied gas (e.g., LPG fuel) already under pressure, can be increased. The booster pump can be designed as a piston compressor, for example. The booster pump may also be referred to as a pressure boosting pump herein. In some examples, the fuel supply system includes one booster pump, but in other examples, one or more additional booster pumps may be included. Including a booster pump instead of a high-pressure pump has an advantageous reduction in weight and reduction in costs.

The booster pump can increase the pressure within the LPG fuel to be fed to the direct injection fuel distributor to a value in a range from about 30 bar to about 50 bar, alternatively from about 35 bar to about 45 bar, depending on the pressure in the LPG tank, which depends, in particular, on the ambient temperature and filling level of the LPG tank. In particular, the booster pump may increase the pressure on a discharge side thereof by about 30 bar. The pressures produced by the booster pump are significantly lower than those produced by a high-pressure pump (e.g., approximately 150 bar). Due to the lower pressure of the LPG fuel to be fed to the direct injection fuel distributor, conventional direct injection valves, which each have a closure part that rises inward from a valve seat to open the respective direct injection valve, can no longer be used reliably due to inadequate atomization of the LPG fuel achievable with said valves at such low pressures of the LPG fuel. The inadequate atomization of the LPG fuel would impair combustion of the LPG fuel in combustion chambers of the internal combustion engine, and thus impair the efficiency of the internal combustion engine system.

Instead, the present disclosure envisages the use of outwardly opening direct injection valves, which each have a closure part that rises outward from a valve seat to open the respective direct injection valve. At the low LPG fuel pressures according to the present disclosure, such direct injection valves have good atomization properties and good flow properties. Here, the outwardly opening closure part of the direct injection valve according to the present disclosure can form at least one impact surface and/or at least one guiding surface for the LPG fuel emerging from the valve opening of the direct injection valve. Furthermore, in its static opening state, such an outwardly opening direct injection valve ensures a higher fuel volume flow than a conventional (inwardly opening) injection valve (e.g., a high Q_stat). Due to this higher volume flow, the duration of injection can be kept appropriately short, which would not be possible with a conventional injection valve. Moreover, the direct injection valve according to the present disclosure offers good mixing of the injected fuel with the induced air in the respective combustion chamber at relatively low pressures, increasing combustion efficiency and increasing the efficiency of the internal combustion engine system.

According to an advantageous refinement, the fuel supply system may further comprise at least one fuel tank for storing gasoline, at least one port injection unit for injecting the gasoline into inlet ducts of the internal combustion engine, and at least one fuel switching valve having a switching state in which the LPG fuel is fed both to the direct injection unit and to the port injection unit. Thus, the internal combustion engine may be supplied exclusively or additionally with the gasoline by switching the fuel switching valve to a corresponding switching position (e.g., switching state). The gasoline may be pumped out of the fuel tank to the fuel switching valve by means of a tank pump. From there, the gasoline can be fed directly to a fuel distributor of the port injection unit. Alternatively, the fuel supply system can be designed in such a way that gasoline emerging from the fuel switching valve is passed via the booster pump to the direct injection fuel distributor and via a pressure reducer to the fuel distributor of the port injection unit. The port injection unit comprises injection valves that are each arranged on an inlet duct of the internal combustion engine and can be supplied with fuel via the fuel distributor of the port injection unit.

The fuel switching valve can be controlled electrically by an electronic open-loop and/or closed-loop control system, such as by a controller of the internal combustion engine system, in order to switch the fuel switching valve. The fuel switching valve may be a 3/2-way valve, for example. The internal combustion engine can be supplied with the gasoline when the LPG fuel has been almost or completely used up (e.g., below a threshold fuel amount). In some examples, the gasoline may be fed to the internal combustion engine by means of the port injection unit. However, in other examples, the gasoline may be additionally supplied to the internal combustion engine via the booster pump and the direct injection unit.

According to another advantageous refinement, the fuel supply system may further comprise at least one pressure reducer. In some examples, the pressure reducer may be coupled between the LPG tank and the fuel switching valve, such as in the example fuel supply system configurations shown in FIGS. 1-2. Both the fuel switching valve and the pressure reducer may be arranged on the discharge side (as shown in FIG. 2) or the suction side (as shown in FIG. 1) of the booster pump. The pressure of the LPG fuel upstream of the fuel switching valve is thereby reduced in such a way that the injection valves of the port injection unit can be supplied with the LPG fuel when the fuel switching valve is in a corresponding switching position. For this purpose, the pressure within the LPG fuel can be reduced by means of the pressure reducer, such as to about 5 bar. This makes it possible to supply both the direct injection fuel distributor and the fuel distributor of the port injection unit with the LPG fuel, allowing very good fuel supply even during maximum loading of the internal combustion engine. Moreover, the internal combustion engine can be supplied with the LPG fuel by means of the port injection unit during a hot start, in which a gaseous fuel can be present in the direct injection unit. In other examples, the pressure reducer may be coupled between the fuel switching valve and the port injection unit, wherein both the fuel switching valve and the pressure reducer are arranged on the suction side of the booster pump, such as in the example fuel supply system configuration shown in FIG. 3. By means of the pressure reducer, the pressure of a fuel (e.g., LPG or gasoline) coming from the fuel switching valve and to be fed to the port injection unit can be reduced. This may be necessary if the pressure within the LPG tank or fuel tank exceeds a certain value.

Turning now to the figures, FIG. 1 shows a schematic illustration of an exemplary embodiment of an internal combustion engine system 1, which may be included in a motor vehicle. In the figures, identical or functionally identical components of FIGS. 1-3 are denoted by the same reference signs and may not be reintroduced.

The internal combustion engine system 1 includes an internal combustion engine 2 with a plurality of cylinders 3. While three cylinders are shown in the example of FIG. 1, in other examples, internal combustion engine 2 may include a different number of cylinders. The internal combustion engine system 1 further includes an intake tract 4 with three inlet ducts 5, one inlet duct 5 coupled to each cylinder 3, through which intake air can be drawn into the cylinders. The amount of intake air provided to the cylinders may be varied using a throttle 6, which may be adjusted in an open-loop and/or a closed-loop manner. Throttle 6 may include a throttle plate and a throttle position sensor. For example, a position of the throttle plate of throttle 6 may be varied by a controller 112 of a control system 190 via a signal provided to an electric motor or actuator included with throttle 6, a configuration that is commonly referred to as electronic throttle control (ETC). In this manner, throttle 6 may be operated to vary the intake air provided to cylinders 3. Feedback concerning the position of the throttle plate may be provided to controller 112 by a throttle position sensor via a throttle position signal TP.

Moreover, the internal combustion engine system 1 includes a fuel supply system 7 for supplying the internal combustion engine 2 with fuel. The fuel supply system 7 comprises an LPG tank 8 for storing an LPG fuel and a direct injection unit 9, which has a direct injection fuel distributor 10 and three direct injection valves 11 (also referred to herein as direct injectors). The direct injection valves 11 are directly coupled to each of the cylinders 3 for directly injecting liquid fuel therein in what is known as direct injection (hereafter also referred to as "DI") of fuel. The direct injection valves 11 each have a closure part (not shown) that rises outward from a valve seat (not shown) to open the respective direct injection valve 11, each direct injection valve 11 supplied with fuel via the direct injection fuel distributor 10.

The fuel supply system 7 further includes a booster pump 12, which is coupled between the LPG tank 8 and the direct injection fuel distributor 10. As shown, a discharge side of the booster pump 12 is directly coupled to the direct injection fuel distributor 10 by a line 13. The booster pump 12 is configured such that a pressure of the fuel on the discharge side of the booster pump 12 is in a range of from 30 bar to 50 bar, in particular, in a range of from 35 bar to 45 bar.

The fuel supply system 7 further includes a fuel tank 14 for storing a non-LPG spark-ignition fuel, such as gasoline. Arranged in the fuel tank 14 is a tank pump (not shown), by means of which the gasoline can be pumped out of the fuel tank 14 at a lower pressure than produced by the booster pump (e.g., at about 5 bar). Moreover, the fuel supply system 7 includes a port injection unit 15 for injecting fuel into the inlet ducts 5 of the internal combustion engine 2 in what is known as port fuel injection (hereafter also referred to as "PFI"). The port injection unit 15 comprises a fuel distributor 16 and three port injection valves 17 (also referred to herein as port injectors) that can be supplied with fuel by means of said distributor. During PFI, atomized fuel mixes with air before the air-fuel mixture is pulled into the cylinder 3 upon opening of a respective intake valve.

The fuel tank may include an electric lift pump for pressurizing the gasoline fuel. The fuel supply system 7 may further include a fuel switching valve 18. For example, the fuel switching valve 18 may be an electrically-actuated 3/2-way solenoid valve. In the example illustrated in FIG. 1, the switching state (e.g., position) of the fuel switching valve 18 is such that the gasoline is fed from the fuel tank 14 to the port injection unit 15 via the fuel switching valve 18 and the LPG fuel does not flow from the LPG tank 8 and to the port injection unit 15 via the fuel switching valve 18. The switching state shown in FIG. 1 may be referred to herein as a first switching state. In the other switching state of the fuel switching valve 18 (e.g., when the fuel switching valve 18 is actuated to switch from the gasoline to the LPG fuel), which may be referred to herein as a second switching state, the LPG fuel is fed both to the direct injection unit 9 via the booster pump 12 and to the port injection unit 15 via the fuel switching valve 18. In order to supply the LPG fuel to the port injection unit 15 via the fuel switching valve 18, the fuel supply system 7 may include a pressure reducer 19, which is coupled between the LPG tank 8 and the fuel switching valve 18. The pressure reducer 19 reduces the pressure of the LPG fuel to be fed to the port injection unit 15 such that the pressure of the LPG fuel delivered to the port injection unit 15 is about 5 bar or less. In the example of FIG. 1, the fuel switching valve 18 and the pressure reducer 19 are arranged on a suction side of the booster pump 12 (e.g., the side of the booster pump 12 that draws fuel into the pump).

It should be understood that each of cylinders 3 may include a spark plug coupled thereto for providing spark to the respective cylinder. For example, the spark provided by the spark plugs may ignite the fuel (LPG and/or gasoline) under select operating modes.

The control system 190 is shown receiving information from a plurality of sensors 116 (various examples of which are described herein) and sending control signals to a plurality of actuators 118 (various examples of which are described herein). As one example, the sensors 116 may include various pressure, temperature, air/fuel ratio, and composition sensors coupled to various locations in the internal combustion engine system 1. For example, output of an engine coolant temperature sensor may be used to provide an indication of a hot start condition. A crankshaft position sensor, such as a Hall effect sensor, may be used to generate an engine speed signal, RPM. Output of a mass airflow (MAF) sensor and/or manifold absolute pressure (MAP) sensor coupled to intake tract 4 may be used to determine engine load. Further, an LPG fuel level sensor may be coupled to LPG tank 8 to provide an indication of an amount (e.g., level) of LPG fuel contained in LPG tank 8. As another example, the actuators 118 may include the direct injection valves 11, the port injection valves 17, the booster pump 12, the fuel switching valve 18, and the throttle 6.

The controller 112 of the control system 190 may be configured as a conventional microcomputer, including a microprocessor unit, input/output ports, read-only memory, random access memory, keep alive memory, a controller area network (CAN) bus, etc. The controller 112 may be configured as a powertrain control module (PCM). The controller 112 may receive input data from the various sensors 116, process the input data, and trigger the actuators 118 in response to the processed input data based on instruction or code programmed therein corresponding to one or more routines. An example control routine is described herein with regard to FIG. 4.

FIG. 2 shows a schematic illustration of a second exemplary embodiment of an internal combustion engine system 20 according to the present disclosure. The internal combustion engine system 20 differs from the internal combustion engine system 1 shown in FIG. 1 only in an arrangement of a fuel supply system 21. In contrast to the fuel supply system 7 of FIG. 1, in which the fuel switching valve 18 and the pressure reducer 19 are arranged on the suction side of the booster pump 12, the fuel switching valve 18 and the pressure reducer 19 of the fuel supply system 21 of FIG. 2 are arranged on a discharge side of the booster pump 12 (e.g., the side of the booster pump 12 that discharges pressurized fuel to the direct injection fuel distributor 10 via the line 13). To avoid repetitions, other aspects of internal combustion engine system 20 are described above with respect to FIG. 1.

FIG. 3 shows a schematic illustration of a third exemplary embodiment of an internal combustion engine system 22 according to the present disclosure. The internal combustion engine system 22 differs from the internal combustion engine system 1 shown in FIG. 1 and the internal combustion engine system 20 shown in FIG. 2 only in an arrangement of a fuel supply system 23. In contrast to the fuel supply system 7 of FIG. 1 and the fuel supply system 21 of FIG. 2, which each show the pressure reducer 19 coupled upstream of the fuel switching valve 18, in the fuel supply system 23 of FIG. 3, the pressure reducer 19 is coupled between the fuel switching valve 18 and the port injection unit 15, with the fuel switching valve 18 is arranged upstream of the pressure reducer 19. In the switching position of the fuel switching valve 18 shown in FIG. 3 (e.g., the first switching state), the gasoline is fed both to the direct injection unit 9 and the port injection unit 15. In the other switching position (e.g., the second switching state) of the fuel switching valve 18 (e.g., when the fuel switching valve 18 is actuated to switch from the gasoline to the LPG fuel), the LPG fuel is fed both to the direct injection unit 9 and to the port injection unit 15. To avoid repetitions, other aspects of internal combustion engine system 22 are described above with respect to FIG. 1.

Thus, internal combustion engine systems shown in FIGS. 1-2 provide fuel supply systems that, based on a switching state of a fuel switching valve, may provide cylinders of the internal combustion engine with gasoline via PFI and LPG fuel via DI or LPG fuel via DI and PFI. An internal combustion engine system shown in FIG. 3 provides a fuel supply system that, based on a switching state of a fuel switching valve, may provide cylinders of the internal combustion engine with gasoline via PFI and DI or LPG fuel via DI and PFI. Thus, the fuel delivery combinations available in the fuel supply systems of FIGS. 1-2 are different than the fuel delivery combinations available in the fuel supply system of FIG. 3. Therefore, similar but different control routines (e.g., methods) may be used to change between different fuels and/or fuel injection locations based on engine operating conditions.

Figure 4:
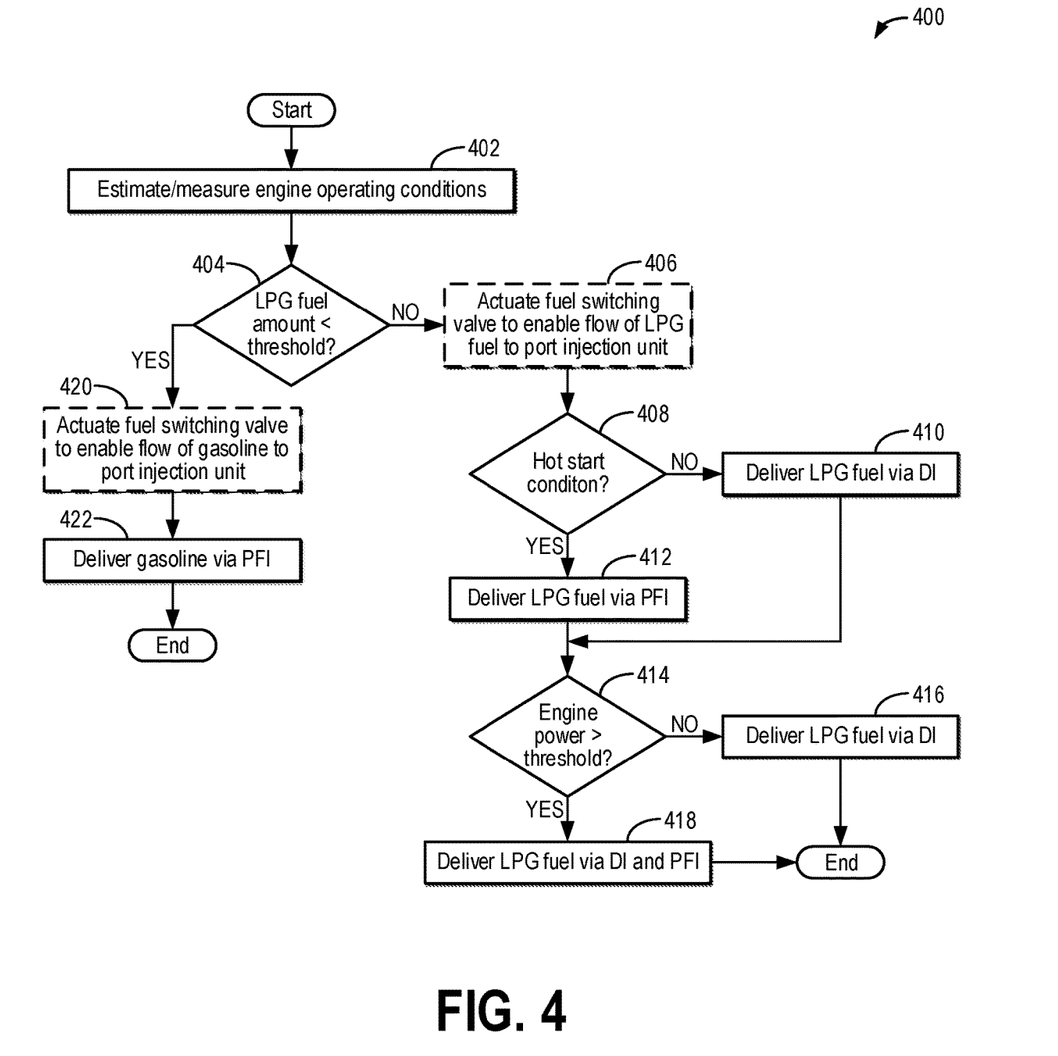
FIG. 4 is a flow chart of a first example method for controlling a fuel supply system to select between different fuels and fuel injection units.

A first example method 400 for switching between fuels and fuel injection units is shown in FIG. 4. In particular, method 400 may be used to control the example fuel supply system configurations shown in FIGS. 1-2. Further, method 400 may include identifying a fueling condition from a limited set of conditions (e.g., picking one of four options), as described further below. Instructions for carrying out method 400 and the rest of the methods included herein may be executed by a controller (e.g., controller 112 of FIGS. 1-3) based on instructions stored on a memory of the controller and in conjunction with signals received from sensors of the internal combustion engine system, such as the sensors described above with reference to FIGS. 1-3 (e.g., sensors 116). The controller may employ engine actuators of the engine system, such as a fuel switching valve (e.g., fuel switching valve 18 of FIGS. 1-3), to adjust engine operation according to the methods described below.

Method 400 begins at 402 and includes estimating and/or measuring engine operating conditions. Operating conditions may be estimated, measured, and/or inferred and may include an amount of LPG fuel (e.g., a fuel level) in an LPG tank (e.g., LPG tank 8 of FIGS. 1-2), engine status (e.g., whether the engine is on or not), a switching state of the fuel switching valve, ambient conditions (e.g., temperature and pressure), engine coolant temperature, engine speed, and engine load, for example.

At 404, it is determined if the LPG fuel amount is less than a threshold amount. The threshold amount may be a positive, non-zero value that corresponds to an amount below which there is not enough LPG fuel available to reliably operate the engine. For example, the LPG tank may be empty or nearly empty. The LPG fuel amount may be determined based on an output of an LPG fuel level sensor coupled to the LPG tank, for example.

If the LPG fuel amount is not less than the threshold amount (e.g., it is greater than or equal to the threshold amount), method 400 proceeds to 406 and optionally includes actuating the fuel switching valve to enable a flow of the LPG fuel to a port injection unit of the internal combustion engine system (e.g., port injection unit 15 of FIGS. 1-2). For example, if the fuel switching valve is in the position illustrated in FIGS. 1-2 (e.g., the first switching state), in which a flow of gasoline to the port injection unit is enabled, then the fuel switching valve may be actuated in order to deliver LPG fuel to the port injection unit. If the fuel switching valve is already positioned to enable the flow of the LPG fuel to the port injection unit (e.g., in the second switching state), then the fuel switching valve will not be actuated and will remain in its switching position.

At 408, it is determined if a hot start condition is present. For example, the hot start condition may be present if an engine start is requested after the engine was recently operated, reached operating temperature, and shut down.

Thus, the hot start condition may be present if the engine temperature (as measured by the engine coolant temperature sensor, for example) is greater than a threshold temperature when the engine start is requested. The threshold temperature may be a positive, non-zero temperature above which all or some of the LPG fuel in a direct injection unit of the internal combustion engine system (e.g., direct injection unit 9 of FIGS. 1-2) may be in a gaseous state. In the hot start condition, fuel delivery via DI may result in the engine stalling or not starting, as the gaseous LPG fuel may not be delivered (or not delivered at a high enough amount) for combustion to reliably occur.

If the hot start condition is not present, such as when the engine is already on and operating (e.g., a duration has passed since engine start) or when the engine temperature is low at engine start, method 400 proceeds to 410 and includes delivering the LPG fuel via DI. As such, the LPG fuel will be supplied from the LPG tank to the direct injection unit via a booster pump (e.g., booster pump 12 of FIGS. 1-2). The booster pump may sufficiently increase the pressure of the LPG fuel (e.g., to around 35 bar) for delivery to cylinders of the internal combustion engine via outwardly-opening direct injection valves (e.g., direct injection valves 11 of FIGS. 1-2). Delivery of LPG fuel via DI may be referred to as a first fueling condition.

If the hot start condition is present at 408, method 400 proceeds to 412 and includes delivering LPG fuel via PFI. During the hot start condition, LPG fuel within the port injection unit may remain a liquid, as the port injection unit may be more thermally isolated from the hot engine than the direct injection unit. LPG fuel may be provided to the port injection unit after first passing through a pressure reducer (e.g., pressure reducer 19 of FIGS. 1-2) and the fuel switching valve. In some examples, such as in the example configuration of FIG. 1, the LPG fuel may be provided using pressure of the LPG tank. In other examples, such as in the example configuration of FIG. 2, the LPG fuel may be pumped via the booster pump. Delivery of LPG fuel via PFI may be referred to as a second fueling condition. While LPG fuel is delivered via PFI, the booster pump may simultaneously pump liquid LPG fuel into the direct injection unit. When the hot start condition is no longer present, such as after the engine has been operated with LPG fuel delivered via PFI for a predetermined duration (e.g., 2-5 min), the engine may then be transitioned to operating in the first fueling condition, with LPG fuel delivered via DI.

At 414, it may be determined if engine power is greater than a threshold. The threshold may be a non-zero, positive amount of engine power above which the engine may be considered to be in a high power operating mode. For example, the engine may be operating in the high power mode if the engine speed is greater than a threshold engine speed and/or the engine load is greater than a threshold engine load, which may both be non-zero, positive value thresholds. The engine power threshold may further depend on a power rating of the engine and a size of the direct injection valves. For example, as the power rating of the engine increases, the engine power threshold may increase (e.g., the threshold may shift to a higher amount of power), and as the size of the direct injection valves increases, the engine power threshold may increase (e.g., the threshold may shift to a higher amount of power).

If the engine power is not greater than the threshold, method 400 proceeds to 416 and includes delivering LPG fuel via DI, as described above at 410. For example, with the engine not operating in the high power mode, fueling via DI alone may be sufficient to achieve the requested power level. Thus, with the hot start not (or no longer) present and the engine not operating in the high engine power mode, the engine may continue to be operated in the first fueling condition. Following 416, method 400 ends.

If the engine power is greater than the threshold at 414, method 400 proceeds to 418 and includes delivering LPG fuel via DI and PFI. For example, in the high power mode, PFI of LPG fuel may be used to supplement the directly injected LPG fuel in order to deliver a greater amount of fuel than the direct injection unit alone can deliver. By delivering the LPG fuel via both DI and PFI, high engine power levels (e.g., higher than the threshold defined above at 414) may be met. Delivery of LPG fuel via both DI and PFI may be referred to as a third fueling condition. In one example, the amount of LPG fuel to be delivered via port and direct injectors is empirically determined and stored in predetermined look-up tables or functions. For example, one table may correspond to determining port injection amounts and another table may correspond to determining direct injections amounts. The two tables may be indexed to engine operating conditions, such as engine speed and engine load, among other engine operating conditions. Furthermore, the tables may output an amount of LPG fuel to inject via PFI and DI to engine cylinders at each cylinder cycle. Thus, LPG fuel may be used to fuel the engine over a variety of operating conditions, with the delivery method (DI and/or PFI) optimized based on the operating conditions (e.g., hot start condition, high engine power mode). Following 418, method 400 ends.

Returning to 404, if the LPG fuel amount is less than the threshold amount, method 400 proceeds to 420 and optionally includes actuating the fuel switching valve to enable the flow of gasoline (e.g., as stored in fuel tank 14 of FIGS. 1-2) to the port injection unit. For example, if the fuel switching valve is in the first switching state, in which the flow of gasoline to the port injection unit is enabled, then the fuel switching valve will not be actuated and will remain in its switching position. If the fuel switching valve is instead positioned to enable the flow of the LPG fuel to the port injection unit (e.g., in the second switching state), then the fuel switching valve may be actuated in order to deliver gasoline to the port injection unit instead of the LPG fuel.

At 422, method 400 includes delivering gasoline via PFI. For example, the gasoline may be delivered to the port injection unit via a fuel pump within the fuel tank, such as a lift pump, after passing through the fuel switching valve. Delivery of gasoline via PFI may be referred to as a fourth fueling condition. The engine may continue to be operated in the fourth fueling condition until the LPG tank is refilled and the LPG fuel amount is no longer below the threshold amount. Following 422, method 400 ends.

Figure 5:
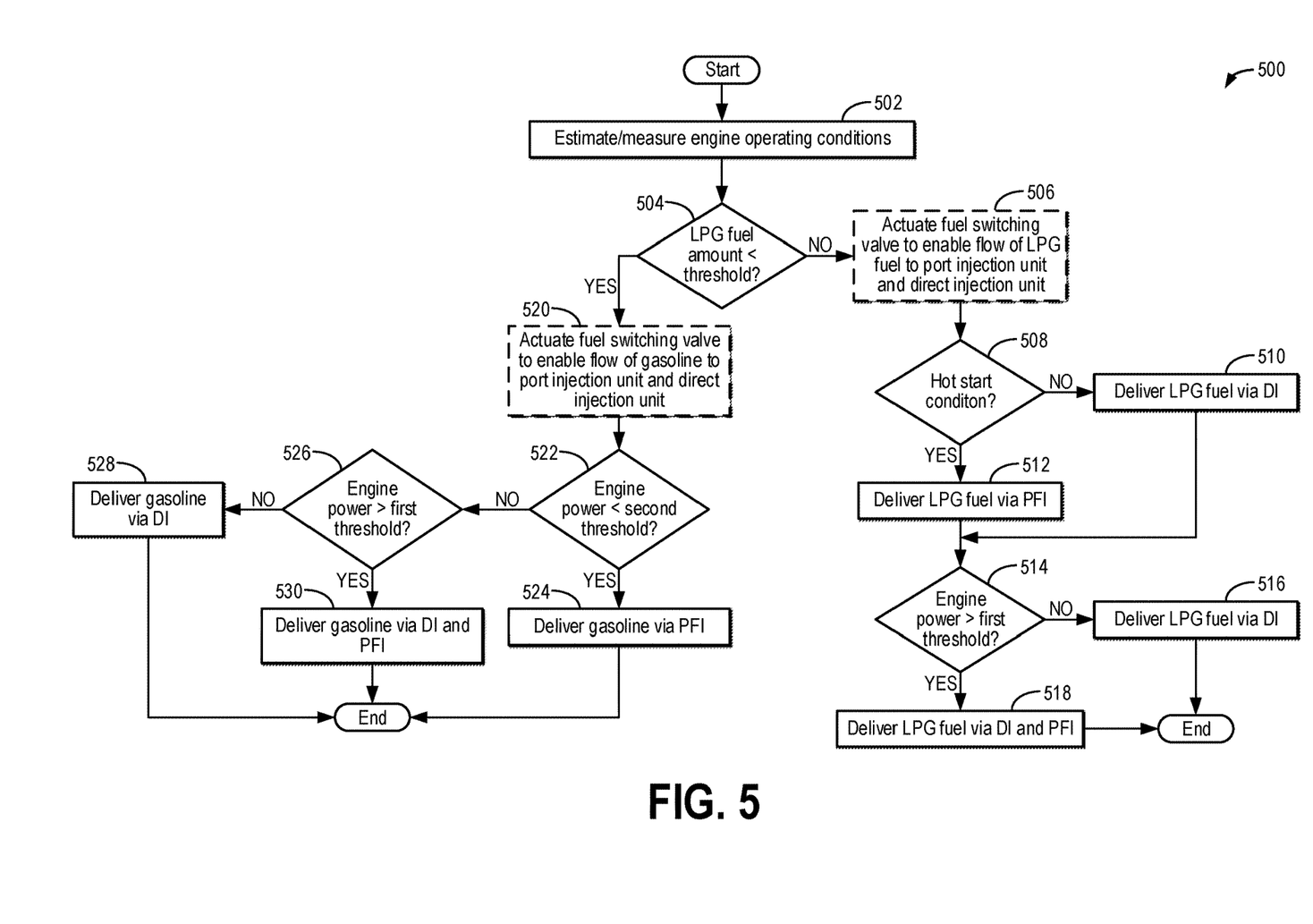
FIG. 5 is a flow chart of a second example method for controlling a fuel supply system to select between different fuels and fuel injection units.
Figure 6:
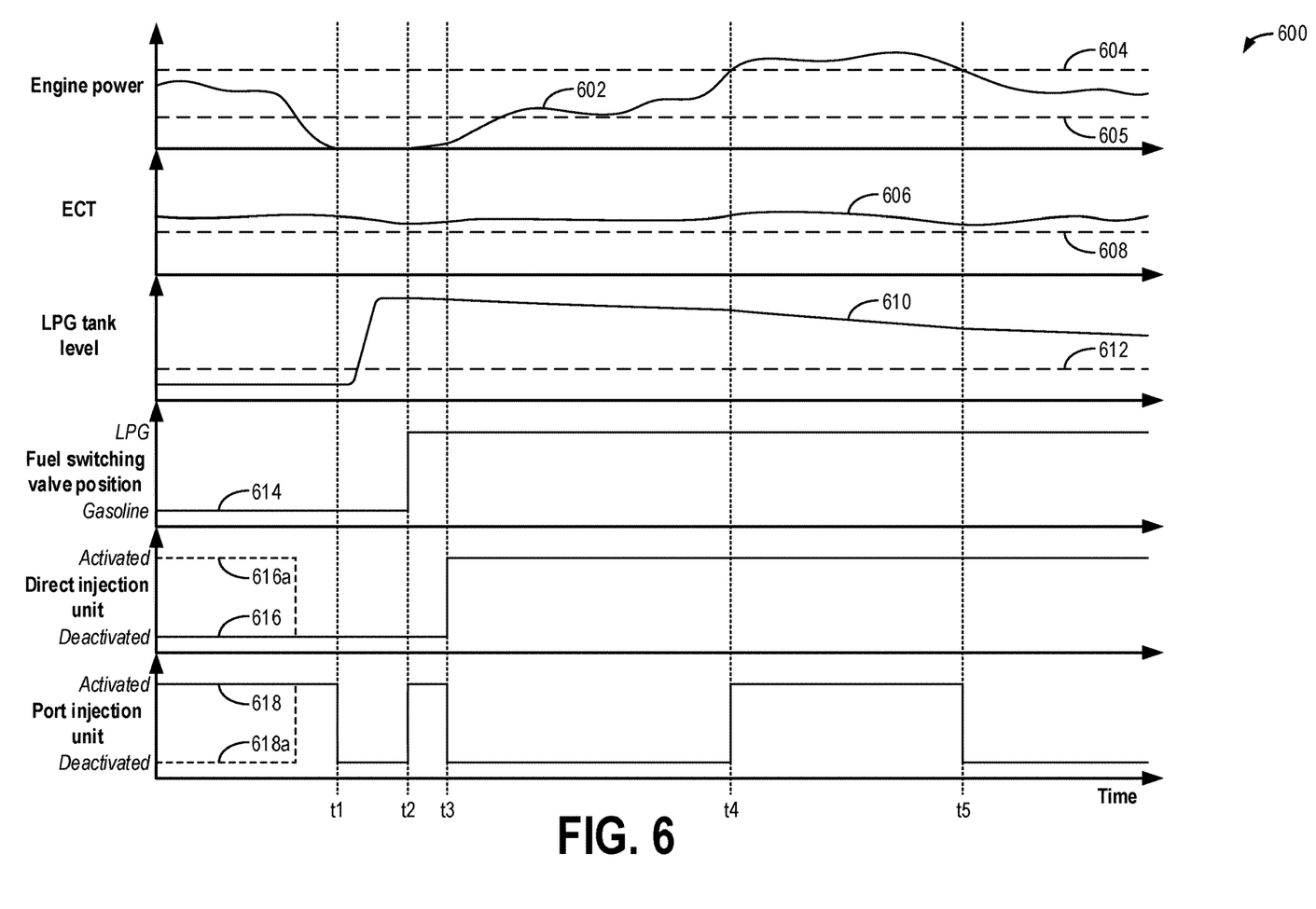
FIG. 6 is a prophetic example timeline for switching between different fuels and fuel injection units during vehicle operation.

Continuing to FIG. 5, a second example method 500 for switching between fuels and fuel injection units is shown. In particular, method 500 may be used to control the example fuel supply system configuration shown in FIG. 3 (e.g., fuel supply system 23). In contrast to the example fuel supply system configurations shown in FIGS. 1-2, the example fuel supply system configuration shown in FIG. 3 additionally enables gasoline to be delivered via DI, and thus, additional fueling conditions may be possible. Thus, method 500 may include identifying a fueling condition from a limited set of conditions that may be larger than the limited set of conditions of method 400 of FIG. 4 (e.g., picking one of six options).

Method 500 begins at 502 and includes estimating and/or measuring engine operating conditions. Operating conditions may be estimated, measured, and/or inferred and may include an amount of LPG fuel (e.g., fuel level) in an LPG tank (e.g., LPG tank 8 of FIG. 3), engine status (e.g., whether the engine is on or not), a switching position of the fuel switching valve, ambient conditions (e.g., temperature and pressure), engine coolant temperature, engine speed, and engine load, for example.

At 504, it is determined if the LPG fuel amount is less than a threshold amount. The threshold amount may be a positive, non-zero value that corresponds to an amount below which there is not enough LPG fuel available to reliably operate the engine. For example, the LPG tank may be empty or nearly empty. The LPG fuel amount may be determined based on an output of an LPG fuel level sensor coupled to the LPG tank, for example. The threshold amount may be the same threshold amount as described above with respect to method 400 of FIG. 4 (e.g., at 404).

If the LPG fuel amount is not less than the threshold amount (e.g., it is greater than or equal to the threshold amount), method 500 proceeds to 506 and optionally includes actuating the fuel switching valve to enable a flow of the LPG fuel to a port injection unit (e.g., port injection unit 15 of FIG. 3) and a direct injection unit (e.g., direct injection unit 9 of FIG. 3) of the internal combustion engine system. For example, if the fuel switching valve is in the position illustrated in FIG. 3, in which a flow of gasoline to both the port injection unit and the direct injection unit is enabled (e.g., the first switching state), then the fuel switching valve may be actuated in order to deliver LPG fuel to the port injection unit and the direct injection unit. If the fuel switching valve is already positioned to enable the flow of the LPG fuel to the port injection unit and the direct injection unit (e.g., the second switching state), then the fuel switching valve will not be actuated and will remain in its switching position.

At 508, it is determined if a hot start condition is present. For example, the hot start condition may be present if an engine start is requested after the engine was recently operated, reached operating temperature, and shut down. Thus, the hot start condition may be present if the engine coolant temperature is greater than a threshold temperature, as described above with reference to method 400 FIG. 4 (e.g., at 408).

If the hot start condition is not present, such as when the engine is already on and operating or when the engine coolant temperature is low at engine start, method 500 proceeds to 510 and includes delivering the LPG fuel via DI. As such, the LPG fuel will be supplied from the LPG tank to the direct injection unit via a booster pump (e.g., booster pump 12 of FIG. 3). The booster pump may sufficiently increase the pressure of the LPG fuel (e.g., to around 35 bar) for delivery to cylinders of the internal combustion engine via outwardly-opening direct injection valves (e.g., direct injection valves 11 of FIG. 3). As in method 400 of FIG. 4, delivery of LPG fuel via DI may be referred to as a first fueling condition.

If the hot start condition is present at 508, method 500 proceeds to 512 and includes delivering LPG fuel via PFI. During the hot start condition, LPG fuel within the port injection unit may remain a liquid, as the port injection unit may be more thermally isolated from the hot engine than the direct injection unit. LPG fuel may be provided to the port injection unit after first passing through a pressure reducer (e.g., pressure reducer 19 of FIG. 3) and the fuel switching valve. In some examples, such as in the example configuration of FIG. 3, the LPG fuel may be provided using pressure of the LPG tank. As in method 400 of FIG. 4, delivery of LPG fuel via PFI may be referred to as a second fueling condition. While LPG fuel is delivered via PFI, the booster pump may simultaneously pump liquid LPG fuel into the direct injection unit. When the hot start condition is no longer present, such as after the engine has been operated with LPG fuel delivered via PFI for a predetermined duration (e.g., 2-5 min), the engine may then be transitioned to operating in the first fueling condition, with LPG fuel delivered via DI.

At 514, it may be determined if engine power is greater than a first threshold. The first threshold may be a non-zero, positive amount of engine power above which the engine may be considered to be in a high power operating mode, as described above with reference to FIG. 4 (e.g., at 414). The first threshold may be the same threshold as at 414 of FIG. 4, for example.

If the engine power is not greater than the first threshold, method 500 proceeds to 516 and includes delivering LPG fuel via DI, as described above at 510. For example, with the engine not operating in the high power mode, fueling via DI alone may be sufficient to achieve the requested power level. Thus, with the hot start condition not (or no longer) present and the engine not operating in the high engine power mode, the engine may continue to be operated in the first fueling condition. Following 516, method 500 ends.

If the engine power is greater than the first threshold at 514, method 500 proceeds to 518 and includes delivering LPG fuel via DI and PFI. For example, in the high power mode, PFI of LPG fuel may be used to supplement the directly injected LPG fuel in order to deliver a greater amount of fuel than the direct injection unit alone can deliver. By delivering the LPG fuel via both DI and PFI, high engine power levels (e.g., higher than the first threshold) may be met. In one example, the amount of LPG fuel to be delivered via port and direct injectors is empirically determined and stored in predetermined look-up tables or functions. For example, one table may correspond to determining port injection amounts and another table may correspond to determining direct injections amounts. The two tables may be indexed to engine operating conditions, such as engine speed and engine load, among other engine operating conditions. Furthermore, the tables may output an amount of LPG fuel to inject via PFI and DI to engine cylinders at each cylinder cycle. As described with respect to method 400 of FIG. 4, delivery of LPG fuel via both DI and PFI may be referred to as a third fueling condition. Thus, LPG fuel may be used to fuel the engine over a variety of operating conditions, with the delivery method (DI and/or PFI) optimized based on the operating conditions (e.g., hot start condition, high engine power mode). Following 518, method 500 ends.

Returning to 504, if the LPG fuel amount is less than the threshold, method 500 proceeds to 520 and optionally includes actuating the fuel switching valve to enable the flow of gasoline (e.g., as stored in fuel tank 14 of FIG. 3) to the port injection unit and the direct injection unit. For example, if the fuel switching valve is in the first switching state, in which the flow of gasoline to both the port injection unit and the direct injection unit is enabled, then the fuel switching valve will not be actuated and will remain in its switching position. If the fuel switching valve is instead in the second switching state and positioned to enable the flow of the LPG fuel to both the port injection unit and the direct injection unit, then the fuel switching valve may be actuated to the first switching state in order to deliver gasoline to the port injection unit and the direct injection unit instead of the LPG fuel.

At 522, it is determined if the engine power is less than a second threshold, which may be lower than the first threshold defined at 514. The second threshold may be a non-zero, positive amount of engine power below which the engine may be considered to be in a low power operating mode. For example, the engine may be operating in the low power operating mode if the engine speed is less than a second threshold engine speed and/or the engine load is less than a second threshold engine load, which may both be non-zero, positive value thresholds that are lower than the respective thresholds defined above with reference to 414 of FIG. 4.

If the engine power is less than the second threshold, meaning the engine is operating in the low power mode, method 500 proceeds to 524 and includes delivering gasoline via PFI. For example, the gasoline may be delivered to the port injection unit via a fuel pump within the fuel tank, such as a lift pump, after passing through the fuel switching valve and the pressure reducer. As described above with respect to method 400 of FIG. 4, delivery of the gasoline via PFI may be referred to as a fourth fueling condition. The engine may continue to be operated in the fourth fueling condition until the LPG tank is refilled and the LPG fuel amount is no longer below the threshold or the engine is no longer operating in the low power mode, as described below. Following 524, method 500 ends.

If the engine power is not less than the second threshold at 522, method 500 proceeds to 526 and includes determining if the engine power is greater than the first threshold (as defined at 514). Thus, it may be determined if the engine is operating in the high power mode. If the engine power is not greater than the first threshold, it may be assumed that the engine power is between the first threshold and the second threshold (and the engine is not operating in the low power mode or the high power mode). If the engine power is not greater than the first threshold, method 500 proceeds to 528 and includes delivering the gasoline via DI. For example, the gasoline may flow through the fuel switching valve to the booster pump. After the fuel pressure is increased by the booster pump (e.g., to around 35 bar), it may be delivered to the direct injection unit. Delivery of the gasoline to internal combustion engine cylinders via DI may be referred to as a fifth fueling condition. Following 528, method 500 ends.

If instead the engine power is above the first threshold, method 500 proceeds to 530 and includes delivering the gasoline via DI and PFI. Similar to at 518, the engine may be operating in the high power mode. In the high power mode, PFI of the gasoline may be used to supplement the directly injected gasoline in order to deliver a greater amount of fuel than the direct injection unit alone can deliver. By delivering the gasoline via both DI and PFI, high engine power levels (e.g., higher than the first threshold defined above at 514) may be met. In one example, the amount of gasoline to be delivered via port and direct injectors is empirically determined and stored in predetermined look-up tables or functions. For example, one table may correspond to determining port injection amounts and another table may correspond to determining direct injections amounts. The two tables may be indexed to engine operating conditions, such as engine speed and engine load, among other engine operating conditions. Furthermore, the tables may output an amount of gasoline to inject via PFI and DI to engine cylinders at each cylinder cycle. The amount of gasoline injected may be different than the amount of LPG fuel injected for the same operating parameters (e.g., at 518), for example. Delivery of the gasoline via both DI and PFI may be referred to as a sixth fueling condition. Following 530, method 500 ends.

Thus, method 400 of FIG. 4 and method 500 of FIG. 5 provide a method for determining a fueling condition of an internal combustion engine and providing a fuel (e.g., LPG fuel or gasoline) at one or more fuel injection units (a direct injection unit and/or a port injection unit) in response thereto. In one example, the method may include determining a first fueling condition and, in response thereto, providing LPG fuel to engine cylinders via the direct injection unit; determining a second fueling condition and, in response thereto, providing LPG fuel to the engine cylinders via the port injection unit; determining a third fueling condition and, in response thereto, providing LPG fuel to the engine cylinders via both the direct injection unit and the port injection unit; determining a fourth fueling condition and, in response thereto, providing gasoline to the engine cylinders via the port injection unit; determining a fifth fueling condition and, in response thereto, providing gasoline to the engine cylinders via the direct injection unit; and determining a sixth fueling condition and, in response thereto, providing gasoline to the engine cylinders via both the direct injection unit and the port injection unit. In some examples, providing LPG fuel via the direct injection unit occurs while or during the first fueling condition and the third fueling condition, and providing LPG fuel via the port injection unit occurs while the first, fourth, fifth, and sixth conditions are not present and/or while or during the second fueling condition and the third fueling condition. Similarly, providing gasoline via the port injection unit occurs while or during the fourth and sixth fueling conditions and/or while the first, second, third, and fifth conditions are not present.

Further, instructions stored in memory may include determining the first fueling condition from output of an LPG fuel level sensor and an indication that a hot start condition is not present (such as based on an output of a temperature sensor and an engine state), and in response to the LPG fuel amount being greater than a threshold and the indication that the hot start condition is not present, optionally actuating a fuel switching valve, actuating a booster pump, and actuating direct injection valves at a pulse width to provide a desired amount of direct injected LPG fuel for given engine operating parameters. As a second example, instructions stored in memory may include determining the second fueling condition from the output of the LPG fuel level sensor and an indication that the hot start condition is present, and in response to the LPG fuel amount not being greater than the threshold and the indication that the hot start condition is present, optionally actuating the fuel switching valve, actuating the booster pump, and actuating port injection valves at a pulse width to provide a desired amount of port injected LPG fuel for the given engine operating parameters. As a third example, instructions stored in memory may include determining the third fueling condition from the output of the LPG fuel level sensor, the indication that the hot start condition is not present, and an indication of an engine power level (such as based on output of a crankshaft speed sensor and/or a mass airflow sensor), and in response to the LPG fuel amount being greater than the threshold, the indication that the hot start condition is not present, and the engine power level being greater than a first threshold, optionally actuating the fuel switching valve, actuating the booster pump, actuating the direct injection valves at a pulse width to provide a desired amount of direct injected LPG fuel for the given engine operating parameters, and actuating the port injection valves at a pulse width to provide a desired amount of port injected LPG fuel for the given engine operating parameters. As a fourth example, instructions stored in memory may include determining the fourth fueling condition from the output of the LPG fuel level sensor, and in response to the LPG fuel amount being less than the threshold, optionally actuating the fuel switching valve, actuating a fuel pump within a fuel tank storing gasoline, and actuating the port injection valves at a pulse width to provide a desired amount of port injected gasoline for the given engine operating parameters. Depending on the configuration of a fuel supply system being used, the instructions for determining the fourth fueling condition may further include an indication that the engine power level is less than a second threshold. As a fifth example, instructions stored in memory may include determining the fifth fueling condition from the output of the LPG fuel level sensor and the indication of the engine power level, and in response to the LPG fuel amount being less than the threshold and the engine power level being less than the first threshold and greater than or equal to the second threshold, optionally actuating the fuel switching valve, actuating a fuel pump within a fuel tank storing gasoline, actuating the booster pump, and actuating the direct injection valves at a pulse width to provide a desired amount of direct injected gasoline for the given engine operating parameters. As a sixth example, instructions stored in memory may include determining the sixth fueling condition from the output of the LPG fuel level sensor and the indication of the engine power level, and in response to the LPG fuel amount being less than the threshold and the engine power level being greater than the first threshold, optionally actuating the fuel switching valve, actuating a fuel pump within a fuel tank storing gasoline, actuating the booster pump, actuating the direct injection valves at a pulse width to provide a desired amount of direct injected gasoline for the given engine operating parameters, and actuating the port injection valves at a pulse width to provide a desired amount of port injected gasoline for the given engine operating parameters.

In some examples, the method may include determining whether to supply LPG fuel via one or more of direct injection and port injection based on a determination of whether the first fueling condition, the second fueling condition, or the third condition is present. Further, the method may include determining whether to supply gasoline via one or more of direct injection and port injection based on a determination of whether the fourth fueling condition, the fifth fueling condition, or the sixth fueling condition is present. The first, second, third, fourth, fifth, and sixth fueling conditions cannot occur simultaneously, and not all of the fueling conditions may be possible based on the configuration of the fuel supply system, but at least one of the fueling conditions must necessarily be present at a given time in a drive cycle. Therefore, in some examples, the controller may include instructions for differentiating between the first, second, third, and fourth fueling conditions. In other examples, the controller may include instructions for differentiating between the first, second, third, fourth, fifth, and sixth fueling conditions. Differentiating includes identifying the fueling condition from a limited set of conditions (e.g., picking one of four options or picking one of six options, depending on the configuration of the fuel supply system). Further, differentiating includes both choosing and eliminating options based on engine operating conditions (e.g., LPG fuel amount, engine temperature at start, and engine power level). For example, when the engine is in the hot start condition, the first, third, fifth, and sixth fueling conditions are not present (e.g., are eliminated). The controller may then differentiate between the second fueling condition and the fourth fueling condition based on the LPG fuel amount, with the second fueling condition chosen when the LPG fuel amount is greater than or equal to the threshold and the fourth fueling condition chosen when the LPG fuel amount is less than the threshold. When the hot start condition is not present, the second fueling condition may be eliminated. The controller may then differentiate between the remaining possible fueling conditions based on the LPG fuel amount and the engine power level. For example, the first fueling condition and the third fueling condition may be further eliminated in response to the LPG fuel amount being less than the threshold, while the fourth, fifth, and sixth fueling conditions may be further eliminated in response to the LPG fuel amount being greater than or equal to the threshold. In the example of the LPG fueling amount being greater than or equal to the threshold, the controller may then differentiate between the first fueling condition and the third fueling condition based on the engine power level, with the first fueling condition selected (and the third fueling condition eliminated) in response to the engine power level being less than or equal to the first threshold and the third fueling condition selected (and the first fueling condition eliminated) in response to the engine power level being greater than the first threshold. In this way, only one fueling condition from the limited set of conditions may be identified for the given engine operating parameters.

Turning now to FIG. 6, an example graph 600 of a timeline for switching between different fuels and fuel injection locations of a fuel supply system (such as the example fuel supply systems shown in FIGS. 1-3) of an internal combustion engine system in response to engine operating conditions is shown. Engine power is shown in plot 602, engine coolant temperature (ECT) is shown in plot 606, LPG tank level is shown in plot 610, fuel switching valve position is shown in plot 614, direct injection unit activation is shown in plot 616, and port injection unit activation is shown in plot 618. Furthermore, a first engine power threshold above which the engine is operating in a high power mode is indicated by dashed line 604, a second engine power threshold below which the engine is operating in a low power mode is indicated by dashed line 605, an engine coolant temperature above which a hot start condition may be present is indicated by dashed line 608, and an LPG tank level threshold below which the engine system is fueled with gasoline instead of LPG fuel is indicated by dashed line 612. For all of the above, the X-axis represents time, with time increasing along the X-axis from left to right. The Y-axis represents the labeled parameter for each plot, with values increasing from bottom to top for plots 602, 606, and 610. For plot 614, the Y-axis represents whether the fuel switching valve (e.g., fuel switching valve 18 of FIGS. 1-3) enables a flow of LPG (e.g., the second switching state) or a flow of gasoline (e.g., the first switching state) to the port injection unit. For plots 616 and 618, the Y-axis represents whether the direct injection unit and port injection unit, respectively, are activated or deactivated, with activated referring to being used to supply fuel to the engine and deactivated referring to not being used to supply fuel to the engine. For example, while activated, fuel may be delivered to the fuel injection unit, and fuel injectors of the fuel injection unit may be actuated to provide fuel to the engine.

Prior to time t1, the engine is on and operated responsive to a torque demand of a vehicle operator. The engine is warm and at operating temperature, as shown by the relatively high engine coolant temperature shown in plot 606. In response to the LPG tank level (e.g., an amount of LPG fuel in the LPG tank, such as LPG tank 8 of FIGS. 1-3) being below the LPG tank level threshold (dashed line 612), the fuel switching valve is positioned to allow the flow of gasoline to the port injection unit (and also the direct injection unit in some examples, such as the example configuration of FIG. 3). In some examples, such as the example configurations shown in FIGS. 1-2, the fuel supply system is not configured to supply gasoline to the direct injection unit. Thus, gasoline will be provided to the engine via the port injection unit, as shown in plot 618 (solid line), regardless of engine power demands. However, in other examples, such as the example configuration shown in FIG. 3, the fuel supply system may supply gasoline to both the port injection unit and the direct injection unit. Thus, in response to the engine power initially being between the first power threshold (dashed line 604) and the second power threshold (dashed line 605), gasoline would be provided to the engine via the direct injection unit (dashed segment 616*a*). Then, in response to the engine power dropping below the second power threshold (dashed line 605) prior to t1, the port injection unit would be activated (dashed segment 618*a*) and the direct injection unit would be deactivated (dashed segment 616*a*) in order to provide gasoline via the port injection unit.

At time t1, the engine is shut down, with the engine power dropping to zero (plot 602). While the engine is off, the port injection unit is deactivated (plot 618), as no fuel is supplied to the engine. An LPG refueling event occurs while the engine is off, and the LPG fuel tank level increases (plot 610). When the engine is restarted at time t2, in response to the LPG fuel tank level being above the LPG tank level threshold (dashed line 612), the fuel switching valve is actuated to the second switching state to enable the flow of LPG fuel to the port injection unit and the direct injection unit. Additionally, at time t2, the engine coolant temperature (plot 606) is above the threshold temperature (dashed line 608), indicating that a hot start condition is present. In response to the hot start condition, the port injection unit is activated (plot 618) and the direct injection unit remains deactivated (plot 616) in order to supply LPG fuel to the engine via the port injection unit and not the direct injection unit, which may contain gaseous LPG fuel.

At time t3, the fuel supply system switches to providing fuel via the direct injection unit by activating the direct injection unit (plot 616) and deactivating the port injection unit (plot 618). For example, the fuel supply system may transition to providing fuel via the direct injection unit after a pre-determined duration following the hot start has elapsed. The LPG fuel is provided to the direct injection unit via a booster pump (e.g., booster pump 12 of FIGS. 1-3), which raises the pressure of the LPG fuel to about 30-50 bar for injection via outwardly opening direct injection valves.

At time t4, the engine power (plot 602) surpasses the first power threshold (dashed line 604), and the engine transitions to the high power operating mode. In response, the port injection unit is activated (plot 618) in order to provide LPG fuel via port injection in addition to the direct injection. The LPG fuel may be delivered to the port injection unit after first passing through a pressure reducer (e.g., pressure reducer 19), which may reduce the pressure of the LPG fuel before it reaches the port injection unit. The proportion of LPG fuel delivered via the direct injection unit and the port injection unit may be determined using look-up tables or functions, as described with respect to FIG. 4. The LPG fuel tank level (plot 610) may decrease at a faster rate when the engine is operated in the high power mode versus when the engine power demand is not high (e.g., not above the first power threshold).

At time t5, the engine power (plot 602) drops below the first power threshold (dashed line 604). Thus, the engine is no longer operating in the high power mode. As a result, supplemental LPG fuel injected via the port injection unit is no longer needed to meet engine power demands, and the port injection unit is deactivated (plot 618). The LPG fuel continues to be provided via the direct injection unit, with the LPG fuel tank level (plot 610) gradually decreasing as the engine is operated.

In this way, an internal combustion engine may be supplied with LPG fuel via a fuel supply system. The LPG fuel may be delivered via direct injection and/or port fuel injection. For direct injection, the pressure of the LPG fuel may be raised by a booster pump, which is less expensive than conventional high-pressure pumps, and then injected into cylinders via outwardly opening direct injection valves. Further, LPG fuel may be supplied via port fuel injection during hot start conditions, when LPG fuel at a direct injection unit may be gaseous, thereby enabling engine start and preventing engine stalling. Furthermore, LPG fuel may also be supplied via port fuel injection as a supplement to directly injected LPG fuel when the engine is operating at a high power. As a fallback, such as when an LPG tank storing the LPG fuel is empty, gasoline may be supplied to the internal combustion engine either by port fuel injection or direct injection, depending on the configuration of the fuel supply system, with a controller actuating a fuel switching valve to switch between the two fuels. Thus, fuel supply may be optimized based on the engine operating conditions and engine demand in order to efficiently provide fuel to the engine.

The technical effect of providing fuel to outwardly opening direct injection valves via a booster pump is that the fuel pressure may be sufficiently raised for direct injection while vehicle costs and weight may be reduced.

As one example, a fuel supply system for an internal combustion engine, comprises: an LPG tank for storing an LPG fuel; a direct injection unit, including a direct injection fuel distributor and direct injection valves supplied with fuel via said distributor, wherein the direct injection valves each have a closure part that rises outward from a valve seat to open the respective direct injection valve; and a booster pump coupled between the LPG tank and the direct injection fuel distributor, a discharge side of the booster pump directly coupled to the direct injection fuel distributor by at least one line. In the preceding example, the fuel supply system additionally or optionally further comprises: a fuel tank for storing gasoline; a port injection unit for injecting the gasoline into inlet ducts of the internal combustion engine; and a fuel switching valve having a switching state in which the LPG fuel is fed both to the direct injection unit and to the port injection unit. In any or all of the preceding examples, the fuel supply system additionally or optionally further comprises a pressure reducer inserted between the LPG tank and the fuel switching valve, wherein the fuel switching valve and the pressure reducer are arranged on the discharge side or a suction side of the booster pump. In any or all of the preceding examples, the fuel supply system additionally or optionally further comprises a pressure reducer inserted between the fuel switching valve and the port injection unit, wherein the fuel switching valve and the pressure reducer are arranged on a suction side of the booster pump. In any or all of the preceding examples, additionally or optionally, the booster pump is configured to provide fuel on the discharge side of the booster pump at a pressure ranging from 30 bar to 50 bar.

As a second example, a system for a motor vehicle comprises: an internal combustion engine, including a plurality of cylinders; an intake tract for supplying air to the internal combustion engine; a plurality of inlet ducts, each inlet duct coupled between the intake tract and one of the plurality of cylinders; a fuel supply system for supplying the internal combustion engine with fuel, including an LPG tank holding an LPG fuel, a direct injection unit for supplying fuel directly to the plurality of cylinders, a port injection unit for supplying fuel to the plurality of cylinders via the plurality of inlet ducts, a booster pump, and a pressure reducer coupled between the LPG tank and the port injection unit; and a controller with computer readable instructions stored on non-transitory memory for: differentiating between fueling conditions based on one or more of an amount of fuel in the LPG tank, a state of the internal combustion engine, and a power of the internal combustion engine; and adjusting operation responsive to an identified fueling condition. In the preceding example, the system additionally or optionally further comprises a fuel tank for storing gasoline and a fuel switching valve having a first switching state and a second switching state, and the controller additionally or optionally holds further computer readable instructions to: in a first fueling condition, actuate the fuel switching valve to the second switching state and supply the LPG fuel to the internal combustion engine solely via the direct injection unit; in a second fueling condition, actuate the fuel switching valve to the second switching state and supply the LPG fuel to the internal combustion engine solely via the port injection unit; in a third fueling condition, actuate the fuel switching valve to the second switching state and supply the LPG fuel to the internal combustion engine via both the direct injection unit and the port injection unit; and in a fourth fueling condition, actuate the fuel switching valve to the first switching state and supply gasoline to the internal combustion engine via the port injection unit. In any or all of the preceding examples, additionally or optionally, the LPG fuel is fed to the direct injection unit and the gasoline is fed to the port injection unit in the first switching state, and the LPG fuel is fed both to the direct injection unit and the port injection unit in the second switching state. In any or all of the preceding examples, additionally or optionally, the first fueling condition includes the amount of fuel in the LPG tank being greater than or equal to a threshold, a hot start condition not being present, and the power of the internal combustion engine being less than or equal to a first threshold power; the second fueling condition includes the amount of fuel in the LPG tank being greater than or equal to the threshold and a hot start condition being present; the third fueling condition includes the amount of fuel in the LPG tank being greater than or equal to the threshold, the hot start condition not being present, and the power of the internal combustion engine being greater than the first threshold power; and the fourth fueling condition includes the amount of fuel in the LPG tank being less than the threshold. In any or all of the preceding examples, additionally or optionally, the gasoline is fed both to the direct injection unit and the port injection unit in the first switching state and the LPG fuel is fed both to the direct injection unit and the port injection unit in the second switching state, and the controller additionally or optionally holds further computer readable instructions to: in a fifth fueling condition, actuate the fuel switching valve to the first switching state and supply gasoline to the internal combustion engine via the direct injection unit; and in a sixth fueling condition, actuate the fuel switching valve to the first switching state and supply gasoline to the internal combustion engine both via the direct injection unit and the port injection unit. In any or all of the preceding examples, additionally or optionally, the fourth fueling condition further includes the power of the internal combustion engine being between less than a second threshold power, which is lower than the first threshold power; the fifth fueling condition includes the amount of fuel in the LPG tank being less than the threshold and the power of the internal combustion engine being at or between the first threshold power and second threshold power; and the sixth fueling condition includes the amount of fuel in the LPG tank being less than the threshold and the power of the internal combustion engine being greater than the first threshold power.

As a third example, a method comprises: adjusting a fuel switching valve between delivering LPG fuel and gasoline to a direct injector of an engine cylinder responsive to a fuel level in an LPG tank; and delivering gasoline to a port injector of the engine cylinder. In the preceding example, the method additionally or optionally further comprises: in response to the fuel level in the LPG tank being at or above a threshold fuel level, actuating the fuel switching valve from a first switching state to a second switching state and providing the engine with the LPG fuel; and in response to the fuel level in the LPG tank being less than the threshold fuel level, maintaining the fuel switching valve in the first switching state and providing the engine with the gasoline. In any or all of the preceding examples, the method additionally or optionally further comprises, while the fuel switching valve is in the second switching state and the engine is provided with the LPG fuel: determining if the engine is in a hot start condition; in response to the engine not being in the hot start condition, actuating a booster pump to increase a pressure of the LPG fuel before injecting the LPG fuel directly into the engine cylinder via the direct injector; and in response to the engine being in the hot start condition, reducing the pressure of the LPG fuel with a pressure reducer before injecting the LPG fuel into an inlet duct of the engine cylinder via the port injector. In any or all of the preceding examples, the method additionally or optionally further comprises, in response to the engine not being in the hot start condition and further in response to a power level of the engine being greater than a first, higher threshold, injecting the LPG fuel both directly into the engine cylinder via the direct injector and into the inlet duct of the engine cylinder via the port injector. In any or all of the preceding examples, additionally or optionally, the hot start condition includes a temperature of the engine being greater than a threshold temperature when an engine start is requested. In any or all of the preceding examples, the method additionally or optionally further comprises, while the fuel switching valve is maintained in the first switching state and the engine is provided with the gasoline: actuating a fuel pump within a fuel tank storing the gasoline to pump the gasoline from the fuel tank; and injecting the gasoline pumped from the fuel tank into one or more of an inlet duct of the engine cylinder via the port injector and directly into the engine cylinder via the direct injector. In any or all of the preceding examples, additionally or optionally, the first switching state enables the gasoline to flow to the port injector and the LPG fuel to flow to the direct injector, and the second switching state enables the LPG fuel to flow to both the port injector and the direct injector. In any or all of the preceding examples, additionally or optionally, the first switching state enables the gasoline to flow to both the port injector and the direct injector, and the second switching state enables the LPG fuel to flow to both the port injector and the direct injector. In any or all of the preceding examples, additionally or optionally, the gasoline pumped from the fuel tank is injected into both the inlet duct of the engine cylinder via the port injector and directly into the engine cylinder via the direct injector in response to a power level of the engine being greater than a first, higher threshold; the gasoline pumped from the fuel tank is injected only into the inlet duct of the engine cylinder via the port injector in response to the power level of the engine being less than a second, lower threshold; and the gasoline pumped from the fuel tank is injected only directly into the engine cylinder via the direct injector in response to the power level of the engine being less than or equal to the first, higher threshold and greater than or equal to the second, lower threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel supply system for an internal combustion engine, comprising:
   an LPG tank for storing an LPG fuel;
   a direct injection unit, including a direct injection fuel distributor and direct injection valves supplied with fuel via said distributor, wherein the direct injection valves each have a closure part that rises outward from a valve seat to open the respective direct injection valve;
   a booster pump coupled between the LPG tank and the direct injection fuel distributor, a discharge side of the booster pump directly coupled to the direct injection fuel distributor by at least one line;
   a fuel tank for storing gasoline;
   a port injection unit for injecting the gasoline into inlet ducts of the internal combustion engine;
   a fuel switching valve having a switching state in which the LPG fuel is fed both to the direct injection unit and to the port injection unit; and
   a pressure reducer inserted between the fuel switching valve and the port injection unit, and wherein the fuel switching valve and the pressure reducer are arranged on a suction side of the booster pump.

2. The fuel supply system as claimed in claim 1, further comprising a pressure reducer inserted between the LPG tank and the fuel switching valve, and wherein the fuel switching valve and the pressure reducer are arranged on the discharge side or a suction side of the booster pump.

3. The fuel supply system as claimed in claim 1, wherein the booster pump is configured to provide fuel on the discharge side of the booster pump at a pressure ranging from 30 bar to 50 bar.

4. A system for a motor vehicle, comprising:
   an internal combustion engine, including a plurality of cylinders;
   an intake tract for supplying air to the internal combustion engine;
   a plurality of inlet ducts, each inlet duct coupled between the intake tract and one of the plurality of cylinders;
   a fuel supply system for supplying the internal combustion engine with fuel, including an LPG tank holding an LPG fuel, a direct injection unit for supplying fuel directly to the plurality of cylinders, a port injection unit for supplying fuel to the plurality of cylinders via the plurality of inlet ducts, a booster pump, and a pressure reducer coupled between the LPG tank and the port injection unit;
   a fuel tank for storing gasoline and a fuel switching valve having a first switching state and a second switching state; and
   a controller with computer readable instructions stored on non-transitory memory for:
      differentiating between fueling conditions based on one or more of an amount of fuel in the LPG tank, a state of the internal combustion engine, and a power of the internal combustion engine; and
      adjusting operation responsive to an identified fueling condition, wherein
         in a first fueling condition, actuate the fuel switching valve to the second switching state and supply the LPG fuel to the internal combustion engine solely via the direct injection unit;
         in a second fueling condition, actuate the fuel switching valve to the second switching state and supply the LPG fuel to the internal combustion engine solely via the port injection unit;
         in a third fueling condition, actuate the fuel switching valve to the second switching state and supply the LPG fuel to the internal combustion engine via both the direct injection unit and the port injection unit; and in a fourth fueling condition, actuate the fuel switching valve to the first switching state and supply gasoline to the internal combustion engine via the port injection unit.

5. The system of claim 4, wherein the LPG fuel is fed to the direct injection unit and the gasoline is fed to the port injection unit in the first switching state, and the LPG fuel is fed both to the direct injection unit and the port injection unit in the second switching state.

6. The system of claim 4, wherein:

the first fueling condition includes the amount of fuel in the LPG tank being greater than or equal to a threshold, a hot start condition not being present, and the power of the internal combustion engine being less than or equal to a first threshold power;

the second fueling condition includes the amount of fuel in the LPG tank being greater than or equal to the threshold and a hot start condition being present;

the third fueling condition includes the amount of fuel in the LPG tank being greater than or equal to the threshold, the hot start condition not being present, and the power of the internal combustion engine being greater than the first threshold power; and the fourth fueling condition includes the amount of fuel in the LPG tank being less than the threshold.

7. The system of claim 6, wherein the gasoline is fed both to the direct injection unit and the port injection unit in the first switching state and the LPG fuel is fed both to the direct injection unit and the port injection unit in the second switching state, and wherein the controller holds further computer readable instructions to:

in a fifth fueling condition, actuate the fuel switching valve to the first switching state and supply gasoline to the internal combustion engine via the direct injection unit; and in a sixth fueling condition, actuate the fuel switching valve to the first switching state and supply gasoline to the internal combustion engine both via the direct injection unit and the port injection unit.

8. The system of claim 7, wherein:

the fourth fueling condition further includes the power of the internal combustion engine being between less than a second threshold power, which is lower than the first threshold power;

the fifth fueling condition includes the amount of fuel in the LPG tank being less than the threshold and the power of the internal combustion engine being at or between the first threshold power and second threshold power; and the sixth fueling condition includes the amount of fuel in the LPG tank being less than the threshold and the power of the internal combustion engine being greater than the first threshold power.

9. A method, comprising:

adjusting a fuel switching valve between delivering LPG fuel and gasoline to a direct injector of an engine cylinder responsive to a fuel level in an LPG tank; and delivering gasoline to a port injector of the engine cylinder, wherein adjusting the fuel switch valve includes:

in response to the fuel level in the LPG tank being at or above a threshold fuel level, actuating the fuel switching valve from a first switching state to a second switching state and providing the engine with the LPG fuel; and in response to the fuel level in the LPG tank being less than the threshold fuel level, maintaining the fuel switching valve in the first switching state and providing the engine with the gasoline, wherein while the fuel switching valve is in the second switching state and the engine is provided with the LPG fuel:

determining if the engine is in a hot start condition;

in response to the engine not being in the hot start condition, actuating a booster pump to increase a pressure of the LPG fuel before injecting the LPG fuel directly into the engine cylinder via the direct injector; and in response to the engine being in the hot start condition, reducing the pressure of the LPG fuel with a pressure reducer before injecting the LPG fuel into an inlet duct of the engine cylinder via the port injector.

10. The method of claim 9, further comprising:

in response to the engine not being in the hot start condition and further in response to a power level of the engine being greater than a first, higher threshold, injecting the LPG fuel both directly into the engine cylinder via the direct injector and into the inlet duct of the engine cylinder via the port injector.

11. The method of claim 9, wherein the hot start condition includes a temperature of the engine being greater than a threshold temperature when an engine start is requested.

12. The method of claim 9, further comprising:

while the fuel switching valve is maintained in the first switching state and the engine is provided with the gasoline:

actuating a fuel pump within a fuel tank storing the gasoline to pump the gasoline from the fuel tank; and injecting the gasoline pumped from the fuel tank into one or more of an inlet duct of the engine cylinder via the port injector and directly into the engine cylinder via the direct injector.

13. The method of claim 12, wherein the first switching state enables the gasoline to flow to the port injector and the LPG fuel to flow to the direct injector, and the second switching state enables the LPG fuel to flow to both the port injector and the direct injector.

14. The method of claim 12, wherein the first switching state enables the gasoline to flow to both the port injector and the direct injector, and the second switching state enables the LPG fuel to flow to both the port injector and the direct injector.

15. The method of claim 14, wherein:

the gasoline pumped from the fuel tank is injected into both the inlet duct of the engine cylinder via the port injector and directly into the engine cylinder via the direct injector in response to a power level of the engine being greater than a first, higher threshold;

the gasoline pumped from the fuel tank is injected only into the inlet duct of the engine cylinder via the port injector in response to the power level of the engine being less than a second, lower threshold; and the gasoline pumped from the fuel tank is injected only directly into the engine cylinder via the direct injector in response to the power level of the engine being less than or equal to the first, higher threshold and greater than or equal to the second, lower threshold.

* * * * *